April 24, 1928.
M. DE CESARE
SOUND PRODUCING DEVICE
Filed March 21, 1923
1,667,104
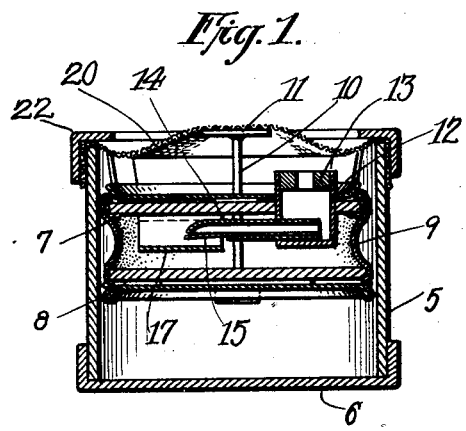
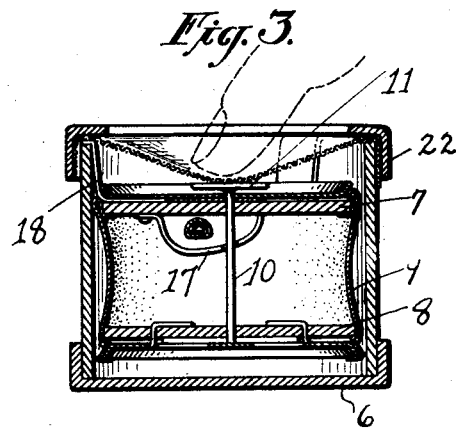
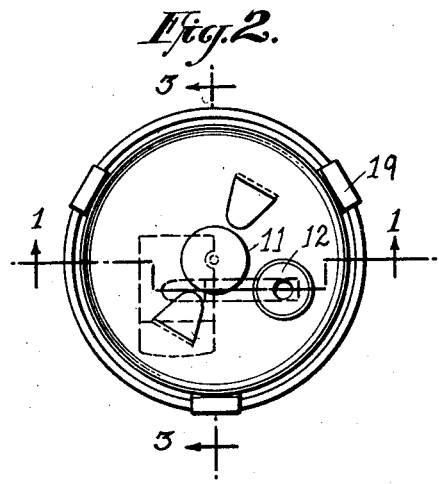
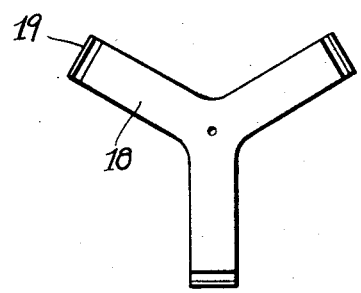
INVENTOR.
Matteo DeCesare.
BY
ATTORNEY.

Patented Apr. 24, 1928.

1,667,104

UNITED STATES PATENT OFFICE.

MATTEO DE CESARE, OF NEWARK, NEW JERSEY, ASSIGNOR, BY MESNE ASSIGNMENTS, TO VOICES INCORPORATED, A CORPORATION OF DELAWARE.

SOUND-PRODUCING DEVICE.

Application filed March 21, 1923. Serial No. 626,616.

This invention relates to sound producing devices and more particularly to a novel and improved mechanism designed to be placed within the body of a toy.

One of the objects of my invention is to provide a sound producing device wherein the air bellows may be extended by a pressure and when the pressure is released, the bellows will collapse and the air trapped therein, pass through a suitable reed and emit a very short sound which decreases in volume and emulates the cry of a cat.

Another object of my invention is the provision of sound producing device having normally collapsed bellows secured between a pair of heads including provision for depressing one head relative to the other as to extend the bellows so that a certain volume of air will be trapped therein and when the pressure is released, the head will return to its initial position permitting the air to pass a reed and emit a somewhat prolonged cry which decreases in tone and simulates the cry of an animal.

Other objects, features and advantages will more clearly appear from the detailed description given below taken in connection with the accompanying sheet of drawings, wherein, Figure 1 is a vertical section of the device taken on the line 1—1 of Figure 2.

Figure 2 is a plan view.

Figure 3 is a vertical section taken on the line 3—3 of Figure 2.

Figure 4 is a detail of the supporting means for the device in the housing.

Referring now to the drawings wherein like reference characters designate corresponding parts throughout the several views, 5 designates a tubular housing or casing having a flanged bottom closure 6, it being understood that the housing and closure may be integral or separable as manufacturing necessities may require.

The sound producing device proper consists of upper and lower heads 7, 8, which are connected by a normally collapsed bellows 9, secured to the periphery of said diaphragms as shown by the drawings. As shown by Figs. 1 and 3, the bellows member 9 is made of elastic material and each of the heads 7 and 8 is composed of two substantially flat members secured together and formed to provide a groove about each head between the edges of the members thereof, and a cord extending about the head 7 acts to secure one edge of the bellows in the groove of the head 7 while another cord extending about the head 8 acts to secure the other edge of the bellows in the groove of the head 8. Thus the head 7 closes one end or side of the bellows while the head 8 closes the opposite end or side of the bellows. Extending centrally through the head 7, I have provided a push rod 10 in the form of a stem which is secured at its lower end to the bottom head 8 so as to permit the latter to be moved relative to the head 7 and consequently extend the resilient bellows 9 to the position shown by Figure 3 of the drawings. The stem 10 is provided with an enlarged head 11 which normally extends to the top edge of the housing and adapted to be depressed by the fingers so as to extend the bellows. Secured within the head 7, I have provided a cup 12 having an apertured closure 13 in the top thereof. The cup extends within the bellows and has connected thereto the transversely extending tube 14 having a reed 15 therein the outer end of which is protected by a strip 17 secured to the bottom of the diaphragm 7. Secured to the top of the diaphragm 7, I have also provided a substantially Y-shaped supporting plate, the outer ends of the arms 18, having downwardly turned hooked ends 19, which overlie the top edge of the housing or casing 5 and consequently properly support the mechanism within the same. A piece of meshed fabric 20 is also provided to prevent the admission of dirt or foreign matter to the air passages, said fabric extending across the top of the housing and held in position over the hooked ends 19 by the annular flanged ring 22 which ring 22 also serves as a cap member for clamping the plate 18 to the edge of the casing.

The head 7 supported by the plate 18 being relatively fixed and stationary in the casing and the other head 8 being relatively movable, it will be seen that when the rod 10 is forced inwardly manually, the bellows will be stretched and expanded to the condition shown in Fig. 3, thereby drawing in air past the reed 15 and through the cup 12. When the rod is released the bellows will collapse due to the elasticity of the material of the bellows as shown in Fig. 1 and this will cause air to be expelled from the bellows past the reed causing the reed to sound.

While I have described my improvements with respect to a particular form of device, various of the improvements may be used with other and widely different forms of devices and many modifications and changes may be made without departing from the spirit and scope of the invention in its broader aspects. Hence I desire to cover all modifications and forms coming within the language or scope of any one or more of the appended claims.

Having thus described my invention, what I claim as new and desire to secure by United States Letters Patent is:—

1. A sound producing device having a tubular bellows of elastic material, a relatively fixed head closing one end of the bellows, a relatively movable head closing the other end of the bellows, means for expanding the bellows by moving the movable head away from the fixed head and stretching the material of the bellows whereby the bellows will collapse due to the elasticity of the material of the bellows, said means including a manually operated push rod secured to the movable head and extending through the bellows and fixed head for extending the bellows, and a sound reed adapted to be operated by the bellows.

2. A sound producing device having a tubular casing, a tubular bellows of elastic material therein, a head fixed with respect to the casing and closing one end of the bellows, a relatively movable head in the casing and closing the other end of the bellows, means for expanding the bellows by moving the movable head away from the fixed head and stretching the material of said bellows whereby the bellows will collapse due to the elasticity of the material of the bellows, said means including a manually operated push rod secured to the movable head and extending through the bellows and fixed head for extending the bellows, and a sound reed carried by the fixed head and connected to be operated upon the collapse of the bellows.

In testimony whereof I affix my signature.

MATTEO DE CESARE. [L. S.]